United States Patent
Hilpert et al.

(10) Patent No.: US 8,180,061 B2
(45) Date of Patent: May 15, 2012

(54) CONCEPT FOR BRIDGING THE GAP BETWEEN PARAMETRIC MULTI-CHANNEL AUDIO CODING AND MATRIXED-SURROUND MULTI-CHANNEL CODING

(75) Inventors: Johannes Hilpert, Nuremberg (DE); Christof Faller, Traegerwilen (CH); Karsten Linzmeier, Erlangen (DE); Ralph Sperschneider, Ebermannstadt (DE)

(73) Assignees: Fraunhofer-Gesellschaft zur Foerderung der angewandten Forschung e.V., Munich (DE); Agere System, Inc., Allentown, PA (US)

( * ) Notice: Subject to any disclaimer, the term of this patent is extended or adjusted under 35 U.S.C. 154(b) by 1614 days.

(21) Appl. No.: 11/458,646

(22) Filed: Jul. 19, 2006

(65) Prior Publication Data

US 2007/0019813 A1 Jan. 25, 2007

Related U.S. Application Data

(63) Continuation of application No. 11/323,965, filed on Dec. 29, 2005, now abandoned.

(60) Provisional application No. 60/701,001, filed on Jul. 19, 2005.

(51) Int. Cl.
*H04R 5/00* (2006.01)

(52) U.S. Cl. .................... 381/22; 381/23; 381/119

(58) Field of Classification Search ............ 381/22, 381/23, 1, 119, 17, 18; 700/94; 704/500, 704/501
See application file for complete search history.

(56) References Cited

U.S. PATENT DOCUMENTS

| | | | |
|---|---|---|---|
| 5,613,035 A * | 3/1997 | Kim | 704/229 |
| 5,912,976 A | 6/1999 | Klayman et al. | |
| 7,382,886 B2 * | 6/2008 | Henn et al. | 381/23 |
| 7,542,896 B2 | 6/2009 | Schuijers et al. | |
| 2003/0219130 A1 | 11/2003 | Baumgarte et al. | |
| 2003/0236583 A1 | 12/2003 | Baumgarte et al. | |
| 2005/0058304 A1 | 3/2005 | Baumgarte et al. | |
| 2005/0226426 A1 * | 10/2005 | Oomen et al. | 381/23 |
| 2006/0171542 A1 * | 8/2006 | Den Brinker et al. | 381/23 |

(Continued)

FOREIGN PATENT DOCUMENTS

EP 1021062 A2 7/2000

(Continued)

OTHER PUBLICATIONS

Herre, J. et al., "The Reference Model Architecture for MPEG Spatial Audio Coding", *Audio Engineering Society Convention Paper*, New York, N.Y., May 28, 2005, pp. 1-13, XP009059973.

(Continued)

*Primary Examiner* — Xu Mei

(74) *Attorney, Agent, or Firm* — Michael A. Glenn; Glenn Patent Group

(57) ABSTRACT

The purpose of the invention is to bridge the gap between parametric multi-channel audio coding and matrixed-surround multi-channel coding by gradually improving the sound of an up-mix signal while raising the bit-rate consumed by the side-information starting from 0 up to the bit-rates of the parametric methods. More specifically, it provides a method of flexibly choosing an "operating point" somewhere between matrixed-surround (no side-information, limited audio quality) and fully parametric reconstruction (full side-information rate required, good quality). This operating point can be chosen dynamically (i.e. varying over time) and in response to the permissible side-information rate, as it is dictated by the individual application.

25 Claims, 9 Drawing Sheets

U.S. PATENT DOCUMENTS

2006/0233379 A1* 10/2006 Villemoes et al. ............ 381/23
2009/0216543 A1*  8/2009 Pang et al. .................. 704/500

FOREIGN PATENT DOCUMENTS

| EP | 1376538 A | 1/2004 |
| EP | 1376538 A1 | 1/2004 |
| JP | 2001-339311 | 12/2001 |
| JP | 2004-078183 | 3/2004 |
| JP | 2004-252068 | 9/2004 |
| JP | 2007-501441 | 1/2007 |
| WO | WO 03/090207 A1 | 10/2003 |
| WO | WO 2004/008805 A1 | 1/2004 |
| WO | WO 2004/086817 | 10/2004 |

OTHER PUBLICATIONS

Mears, D. J. et al., "Matrixed Surround Sound in an MPEG Digital World", *Journal of the Audio Engineering Society*, Audio Engineering Society, New York, N.Y., vol. 46, No. 4, Apr. 1998, pp. 331-335, XP000783409, ISSN: 1549-4950.

Breebaart, J. et al., "MPEG Spatial Audio Coding/MPEG Surround: Overview and Current Status", *Audio Engineering Society Convention Paper*, New York, N.Y., Oct. 7, 2005, pp. 1-17, XP002379094.

Moriya, Takehiro; "Principles of Speech and Audio Coding and Standardization"; Sep. 16, 2999; The Institue of Electronics, Information and Communication Engineers Research Paper, vol. 99, No. 299, pp. 1-6.

English Translation of Office Action, mailed Apr. 12, 2011, in related Japanese Patent Application No. 2008-521820, 5 pages.

* cited by examiner

CONCEPT FOR BRIDGING THE GAP BETWEEN PARAMETRIC MULTI-CHANNEL AUDIO CODING AND MATRIXED-SURROUND MULTI-CHANNEL CODING

CROSS-REFERENCE TO RELATED APPLICATION

This application is a continuation of U.S. patent application Ser. No. 11/323,965 filed on Dec. 29, 2005 now abandoned, which claims the benefit of U.S. application Ser. No. 60/701,001 filed on Jul. 19, 2005, which are incorporated herein by this reference thereto.

FIELD OF THE INVENTION

The present invention relates to multi-channel audio coding and transmission, and in particular to techniques to encode multi-channel audio in a manner that is fully backwards compatible with stereo devices and formats, allowing for an efficient coding of multi-channel audio.

BACKGROUND OF THE INVENTION AND PRIOR ART

Parametric coding of multi-channel audio signals is an ongoing topic of research. Generally two approaches to encode multi-channel audio signals can be distinguished. The Moving Pictures Experts Group (MPEG), a subgroup of the International Organization for Standardization (ISO), is currently working on the standardization of technology for the reconstruction of multi-channel audio content from stereo or even mono down-mix signals by adding only a small amount of helper information to the down-mix signals.

In parallel stereo to multi-channel up-mix methods are being developed which do not need any additional side-information that is not already (implicitly) contained in the down-mix signal in order to reconstruct the spatial image of the original multi-channel audio signal.

Existing methods for stereo-compatible multi-channel transmission without additional side-information that gained practical relevance can mostly be characterized as matrixed-surround methods, such as Dolby Pro Logic (Dolby Pro Logic II) and Logic-7, as described in more detail in "Dolby Surround Pro Logic II Decoder—Principles of Operation", http://www.dolby.com/assets/pdf/tech_library/209_Dolby_Surround_Pro_Logic_II_Decoder_Principles_of_Operation.pdf and in "Multichannel Matrix Surround Decoders for Two-Eared Listeners", Griesinger, D., 101st AES Convention, Los Angeles, USA, 1996, Preprint 4402. The common principle of these methods is that they make use of dedicated ways of multi-channel or stereo down-mixing where the encoder applies phase shifts to the surround channels prior to mixing them together with front and centre channels to form a stereo down-mix signal. The generation of the down-mix signal (Lt, Rt) is depicted in the following equation:

$$\begin{bmatrix} Lt \\ Rt \end{bmatrix} = \begin{bmatrix} 1 & 0 & q & a\cdot j & b\cdot j \\ 0 & 1 & q & -b\cdot j & -a\cdot j \end{bmatrix} \begin{bmatrix} Lf \\ Rf \\ C \\ Ls \\ Rs \end{bmatrix} \quad (1)$$

The left down-mix signal (Lt) consists of the left-front signal (Lf), the centre signal (C) multiplied by a factor q, the left-surround signal (Ls) phase rotated by 90 degrees („j') and scaled by a factor a, and the right-surround signal (Rs) which is also phase rotated by 90 degrees and scaled by a factor b. The right down-mix signal (Rt) is generated similarly. Typical down-mix factors are 0.707 for q and a, and 0.408 for b. The rationale for the different signs of the surround channels for the right down-mix signal (Rt) and the left down-mix signal (Lt) is, that it is advantageous to mix the surround channels in anti-phase in the down-mix pair (Lt, Rt). This property helps the decoder to discriminate between front and rear channels from the down-mix signal pair. Hence the down-mix matrix allows for a partial reconstruction of a multi-channel output signal out from the stereo down-mix within the decoder by applying a de-matrixing operation. How close the re-created multi-channel signal resembles the original encoder input signal, however, depends on the specific properties of the multi-channel audio content.

An example for a coding method adding helper information, also called side information, is MPEG Surround audio coding. This efficient way for parametric multi-channel audio coding is for example described in "The Reference Model Architecture for MPEG Spatial Audio Coding", Herre, J., Purnhagen, H., Breebaart, J., Faller, C., Disch, S., Kjoerling, K., Schuijers, E., Hilpert, J., Myburg, F., Proc. 118th AES Convention, Barcelona, Spain, 2005 and in "Text of Working Draft for Spatial Audio Coding (SAC)", ISO/IEC JTC1/SC29/WG11 (MPEG), Document N7136, Busan, Korea, 2005.

A schematic overview of an encoder used in spatial audio coding is shown in FIG. 6. The encoder splits incoming signals 10 (input 1, ... input N) in separate time-frequency tiles by means of Quadrature Mirror Filters 12 (QMF). Groups of the resulting frequency tiles (bands) are referred to as "parameter bands". For every parameter band, a number of spatial parameters 14 are determined by a parameter estimator 16 that describes the properties of the spatial image, e.g. level differences between pairs of channels (CLD), cross correlation between pairs of channels (ICC) or information on signal envelopes (CPC). These parameters are subsequently quantized, encoded and compiled jointly into a bit-stream of spatial data. Depending on the operation mode, this bit-stream can cover a wide range of bit-rates, starting from a few kBit/s for good quality multi-channel audio up to tenths of kBit/s for near-transparent quality.

Besides the extraction of parameters, the encoder also generates a mono or stereo down-mix from the multi-channel input signal. Moreover, in case of a stereo down-mix, the user has the choice of a conventional (ITU-style) stereo down-mix or of a down-mix that is compatible with matrixed-surround systems. Finally, the stereo down-mix is transferred to the time-domain by means of QMF synthesis banks 18. The resulting down-mix can be transmitted to a decoder, accompanied by the spatial parameters or the spatial parameter bit-stream 14. Preferably, the down-mix is also encoded before transmission (using a conventional mono or stereo core coder), while the bit-streams of the core coder and the spatial parameters might additionally be combined (multiplexed) to form a single output bit-stream.

A decoder, as sketched in FIG. 7, in principle performs the reverse process of the encoder. An input-stream is split into a core coder bit-stream and a parameter bit-stream. This is not shown in FIG. 7. Subsequently, the decoded down-mix 20 is processed by a QMF analysis bank 22 to derive parameter bands that are the same as those applied in the encoder. A spatial synthesis stage 24 reconstructs the multi-channel signal by means of control data 26 (i.e., the transmitted spatial parameters). Finally, the QMF-domain signals are transferred to the time domain by means of a QMF synthesis bank 27 that derives the final multi-channel output signals 28.

FIG. 8 shows a simple example of a QMF analysis, as it is performed within the prior art encoder in FIG. 6 and the prior art decoder in FIG. 7. An audio sample 30, sampled in the time domain and having four sample values is input into a filter bank 32. The filter bank 32 derives three output samples 34a, 34b and 34c having four sample values each. In an ideal case, the filter bank 32 derives the output samples 34a to 34c such that the samples within the output signals do only comprise information on discrete frequency ranges of the underlying audio signal 30. In the case shown in FIG. 8, the sample 34a has information on the frequency interval ranging from $f_0$ to $f_1$, the sample 34b has information of the frequency interval $[f_1, f_2]$ and the sample 34c has information on the frequency interval $[f_2, f_3]$. Although the frequency intervals in FIG. 8 do not overlap, in a more general case the frequency intervals of the output samples coming out of a filter bank may very well have a frequency overlap.

A prior art encoder can, as already described above, deliver either an ITU-style down-mix or a matrixed-surround compatible down-mix, when a two-channel down-mix is desired. In the case of a matrixed-surround compatible down-mix (using for example the matrixing approach given in Equation 1), one possibility would be that the encoder generates a matrixed-surround compatible down-mix directly.

FIG. 9 shows an alternative approach to generate a matrixed-surround compatible down-mix using a down-mix post processing unit 30 working on a regular stereo down-mix 32. The matrixed-surround processor 30 (MTX encoder) modifies the regular stereo down-mix 32 to make it matrixed-surround compatible guided by the spatial parameters 14 extracted by the parameter extraction stage 16. For transmission, a matrixed-surround compatible down-mix 34 is transferred to the time domain by a QMF synthesis using the QMF synthesis bank 18.

Deriving the matrixed-surround compatible signal by post-processing a regular stereo down-mix has the advantage that the matrixed-surround compatibility processing can be fully reversed at a decoder side if the spatial parameters are available.

Although both of the approaches are suited to transmit a multi-channel signal, there are specific drawbacks of state of the art systems. Matrixed-surround methods are very efficient (since no additional parameters are required) at the price of a very limited multi-channel reconstruction quality.

Parametric multi-channel approaches on the other hand require a higher bit-rate due to the side information, which becomes a problem when a limit is set as a maximum acceptable bit-rate for the parametric representation. When the encoded parameters require a comparatively high amount of bit-rate, the only possible way to stay within such a bit-rate limit is to decrease the quality of an encoded down-mix channel by increasing the compression of the channel. Hence, the result is a general loss in audio quality, which may be unacceptably high. In other words, for parametric multi-channel approaches, there is often a hard limit of the minimum bit-rate that is required for the spatial parameter layer, which may in some cases be unacceptably high.

Although principle backwards compatibility between matrixed-surround methods and spatial audio methods can be achieved by a prior art encoder as illustrated in FIG. 9, no additional bit-rate can be saved with this approach when only matrix-based decoding is required. Even then the full set of spatial parameters has to be transmitted, wasting transmission bandwidth.

Whereas the bit-rate that has to be spent when applying the parametric method may be too high in case of certain application scenarios, the audio quality delivered by the methods without transmission of side-information might not be sufficient.

The US Patent Application 2005157883 is showing an apparatus for constructing a multi-channel audio signal using an input signal and parametric side information, the input signal including the first input channel and the second input channel derived from an original multi-channel signal, and the parametric side information describing interrelations between channels of the multi-channel original signal.

SUMMARY OF THE INVENTION

It is the object of the present invention to provide a concept for more efficient coding of multi-channel audio signals while being backwards compatible to matrix-based coding solutions.

In accordance with a first aspect of the present invention, this object is achieved by a multi-channel audio decoder for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, comprising: a processor for deriving an intermediate signal from the audio signal, using a first deriving rule for deriving a first portion of the intermediate signal, the first portion of the intermediate signal corresponding to the first portion of the multi-channel audio signal, wherein the first deriving rule is depending on the first parametric data; and using a second deriving rule for deriving a second portion of the intermediate signal, the second deriving rule using no parametric data or the second parametric data.

In accordance with a second aspect of the present invention, this object is achieved by a multi-channel encoder for generating a parametric representation describing spatial properties of a multi-channel audio signal, the multi-channel encoder comprising: a parameter generator for generating spatial parameters; an output interface for generating the parametric representation, wherein the parameter generator or the output interface is adapted to generate the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

In accordance with a third aspect of the present invention, this object is achieved by a method for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, the method comprising: deriving an intermediate signal from the down-mix signal using a first deriving rule depending on the first parametric data for deriving a first portion of the intermediate signal, the first portion of the intermediate signal corresponding to the first portion of the multi-channel audio signal; and deriving a second portion of the intermediate signal using a second deriving rule, the second deriving rule using the second parametric data or no parametric data.

In accordance with a fourth aspect of the present invention, this object is achieved by a method for generating a parametric representation describing spatial properties of a multi-channel audio signal, the method comprising: generating spatial parameters; and generating the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

In accordance with a fifth aspect of the present invention, this object is achieved by a parametric representation describing spatial properties of a multi-channel audio signal, the parametric representation including first parametric data for a first portion of the multi-channel signal and wherein the parametric representation is including no parametric data or second parametric data for a second portion of the multi-channel signal, the second parametric data requiring less information units than the first parametric data for an identical portion of the multi-channel signal.

In accordance with a sixth aspect of the present invention, this object is achieved by a computer program having a program code for performing, when running on a computer, a method for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, the method comprising: deriving an intermediate signal from the down-mix signal using a first deriving rule depending on the first parametric data for deriving a first portion of the intermediate signal, the first portion of the intermediate signal corresponding to the first portion of the multi-channel audio signal; and deriving a second portion of the intermediate signal using a second deriving rule, the second deriving rule using the second parametric data or no parametric data.

In accordance with a seventh aspect of the present invention, this object is achieved by a computer program having a program code for performing, when running on a computer, a method for generating a parametric representation describing spatial properties of a multi-channel audio signal, the method comprising: generating spatial parameters; and generating the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

In accordance with an eighth aspect of the present invention, this object is achieved by a transcoder for generating a parametric representation of a multi-channel audio signal using spatial parameters describing the spatial properties of the multi-channel audio signal, comprising: a parameter generator to generate the parametric representation such that the parametric representation includes first parametric data being derived from the spatial parameters for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

The present invention is based on the finding that a multi-channel audio signal can be efficiently represented by a parametric representation, when a first deriving rule is used for deriving first parametric data of the parametric representation describing a first portion of the multi-channel signal, and when for a second portion of the multi-channel signal second parametric data or no parametric data is included in the parametric representation, whereas the second parametric data is requiring less information units than the first parametric data when describing an identical portion of the multi-channel signal.

Thus, a first portion of the multi channel signal is represented by first parameters allowing for a reconstruction of the multi channel signal with higher quality and a second portion can be represented by second parameters allowing for a reconstruction with slightly lower quality. The bit-rate consumed by the first parametric data is consequently higher than the bit rate consumed by the second parametric data when both parametric data is to describe the same portion of a multi-channel signal. In other words, the first parameters require more bit rate per signal portion than the second parameters.

The purpose of the invention is to bridge the gap between both prior art worlds by gradually improving the sound of the up-mix signal while raising the bit-rate consumed by the side-information starting from 0 up to the bit-rates of the parametric methods. That is, the present invention aims at bridging the gap in bit-rates and perceptual quality between fully parametric methods and matrixed-surround methods. More specifically, it provides a method of flexibly choosing an "operating point" somewhere between matrixed-surround (no side-information, limited audio quality) and fully parametric reconstruction (full side-information rate required, good quality). This operating point can be chosen dynamically (i.e. varying in time) and in response to the permissible side-information rate, as it is dictated by the individual application.

By dynamically choosing the size of the first portion of the multi-channel audio signal which is the part of the multi-channel audio signal that is represented by the spatial audio parameters, the demanded bit-rate can be varied within a broad range. Representing major parts of a multi-channel signal by the spatial audio parameters will consume a comparatively high bit-rate at the benefit of a good perceptual quality. Since for the second portion of the multi-channel audio signal a parameter deriving rule is chosen that results in parameters consuming less bit-rate, the resulting total bit-rate can be decreased by increasing the size of the second portion of the multi-channel signal. In a preferred embodiment of the present invention, no parametric data at all is transmitted for the second portion of the multi-channel signal, which is of course most bit-saving. Therefore, by dynamically shifting the size of the first portion with respect to the size of the second portion, the bit-rate (or the perceptual quality) can be dynamically adjusted to the needs.

In a preferred embodiment of the present invention, a down-mix signal is derived in a matrix compatible way. Therefore, the first portion of the multi-channel audio signal can be reproduced with high perceptual quality using the spatial audio parameters and the second portion of the multi-channel signal can be reproduced using matrix-based solutions. This allows for a high-quality reproduction of parts of the signals requiring higher quality. At the same time, the overall bit-rate is decreased by relying on a matrix-based reproduction for signal parts less vital for the quality of a reproduced signal.

In a further preferred embodiment of the present invention, the inventive concept is applied on the decoder side within a QMF representation of a received down-mix signal. The up-mixing process can principally be sub-divided into three steps:

Pre-processing of the input signals (down-mix signals received in the QMF domain) by application of a pre-de-correlator matrix;

de-correlation of part of the pre-processed signals; and mixing the thus derived signals (pre-processed signals and de-correlated signals) within a mix matrix, the output of the mixing being the channels of the up-mix signal.

Both, the pre-de-correlator matrix as well as the mixed-matrix are two-dimensional matrices with the dimensions "number of time slots" on the one hand and "number of parameter bands" on the other hand. Within a decoding process, the elements of these matrices are filled up with values that are derived from the parameters read from the spatial bit-stream, i.e. by the first parametric data. When the first parametric data is only received for a first portion or the multi-channel signal, only that portion of a reconstruction or a multi-channel signal can be derived using the first parametric data submitted. The matrix elements for deriving the second part of the reconstruction of the multi-channel signal are, according to the present invention, derived using matrix compatible coding schemes. These matrix elements can therefore either be derived based only on knowledge achieved from the down-mix signal or be replaced by pre-defined values.

In a preferred embodiment, a multi-channel audio decoder according to the present invention recognizes by the amount of the transmitted first parametric data, which part of the matrix or which part of the multi-channel audio signal is to be processed by the rule depending on the spatial parameters and which part is to be processed by the matrix based solution.

In another embodiment of the present invention, an audio encoder creates window information, indicating which parts of a multi-channel signal are being processed by the matrix based solution or by the spatial audio compatible approach. The window information is included in the parametric representation of a multi-channel signal.

An inventive decoder, therefore, is able to receive and to process the window information created to apply the appropriate up-mixing rules on the portions of the multi-channel audio signal indicated by the window information.

In a preferred embodiment of the present invention, the inventive concept is applied in the QMF domain during the signal processing, i.e. in a domain where the signals are represented by multiple representations each representation holding information on a certain frequency band.

In a further preferred embodiment of the present invention, the side-information free method (matrix based approach) is applied only to the higher frequency parts while applying (explicit) parametric information (i.e. the first encoding and decoding rule) for a proper reproduction of the low-frequency parts. This is advantageous due to the property of the human hearing to notice small deviations of two similar signals (e.g. phase deviations) a lot easier for low frequencies than for high frequencies.

A great benefit of the present invention is that a backwards compatibility of a spatial audio encoding and decoding scheme with matrix based solutions is achieved without having to introduce additional hard- or software when the encoding and decoding rules of the spatial audio coders are chosen appropriately.

Furthermore, the compatibility is achieved without having to transmit additional data, as it is the case in other prior art attempts. The coding scheme according to the present invention is furthermore extremely flexible, as it allows a seamless adjustment of the bit-rate or the quality, i.e. a smooth transition between full matrix based coding to full spatial audio coding of a given signal. That is, the coding scheme applied can be adjusted to the actual needs, either with respect to the required bit-rate or with respect to the desired quality.

BRIEF DESCRIPTION OF THE DRAWINGS

Preferred embodiments of the present invention are subsequently described by referring to the enclosed drawings, wherein.

DETAILED DESCRIPTION OF THE PREFERRED EMBODIMENTS

Figure 1:
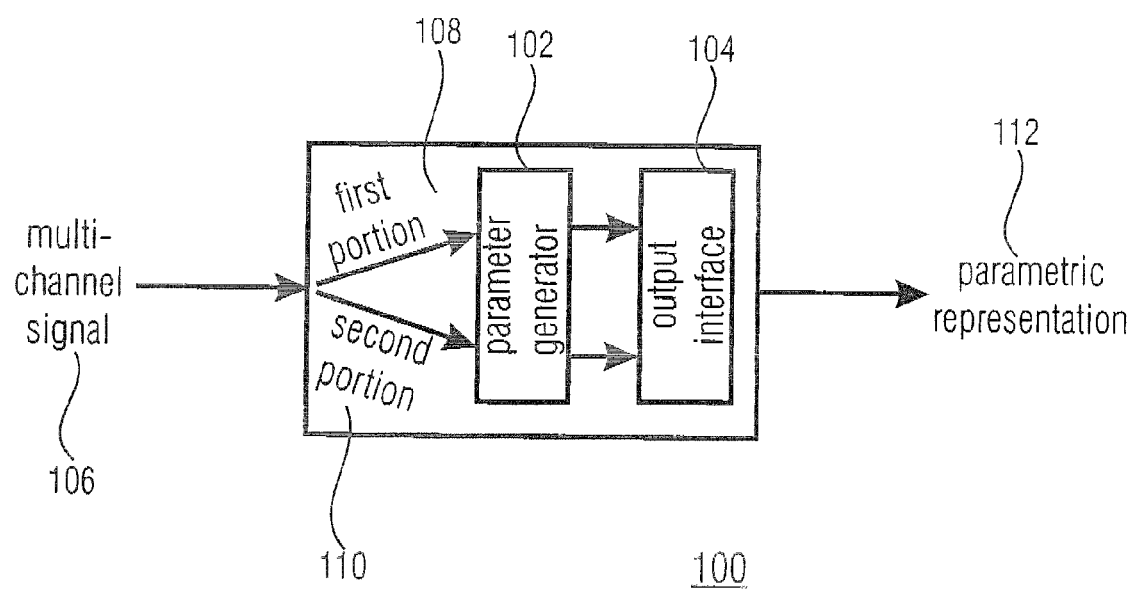
FIG. 1 shows an inventive encoder.

FIG. 1 shows an inventive multi-channel encoder. The multi-channel encoder 100 is having a parameter generator 102 and an output interface 104.

A multi-channel audio signal 106 is input into the encoder 100, where a first portion 108 and a second portion 110 of the multi-channel signal 106 are processed. The parameter generator 102 receives the first portion 108 and the second portion 110 and derives spatial parameters describing spatial properties of the multi-channel signal 106.

The spatial parameters are transferred to the output interface 104 that derives a parametric representation 112 of the multi-channel signal 106 such that the parametric representation 112 includes first parametric data for a first portion 108 of the multi-channel signal and wherein for a second portion 110 or the multi-channel signal 106 second parametric data requiring less information than the first parametric data or no parametric data is included in the parametric representation 112.

Several variations of the multi-channel encoder 100 are possible to achieve the same goal. For example, the parameter generator 102 can apply two different parameter deriving rules on the first portion 108 and on the second portion 110 that result in different parameter sets that are then transferred to the output interface 104 that combines the different parameter sets into the parametric representation 112. A special and preferred case is that for the second portion 110 no parameters are included in the parametric representation (and therefore not derived by the parameter generator 102) since on a decoder side the decoder derives the required decoding parameters by some heuristic rules.

Another possibility is that the parameter generator 102 derives a full set of spatial audio parameters as well for the first portion 108 as for the second portion 110. Hence, the output interface 104 would have to process the spatial parameters such that the second parametric data require less bits than the first parametric data.

Furthermore, the output interface 104 could add an additional window signal to the parametric representation 112 that shall signal to a decoder, how the multi-channel signal 106 was split into the first portion 108 and into the second portion 110 during the encoding. In a modification of the preferred embodiment of a multi-channel encoder 100, the multi-channel encoder 100 may additionally have a portion decider for deciding, which part of the multi-channel signal 106 is used as the first portion 108 and which part is used as the second portion 110, the decision being based on a quality criterion.

The quality criterion can be derived with respect to a resulting total bit-rate of the parametric representation 112 or with respect to quality aspects, taking into account the perceptual quality of a reproduction of the multi-channel signal 106 based on the parametric representation 112.

A major advantage is that the bit-rate consumed by the parametric representation can thus be varied in time, assuring that the quality criterion is met at any time during the encoding while allowing for an overall reduction of the required bit-rate compared to prior art methods.

Figure 2:
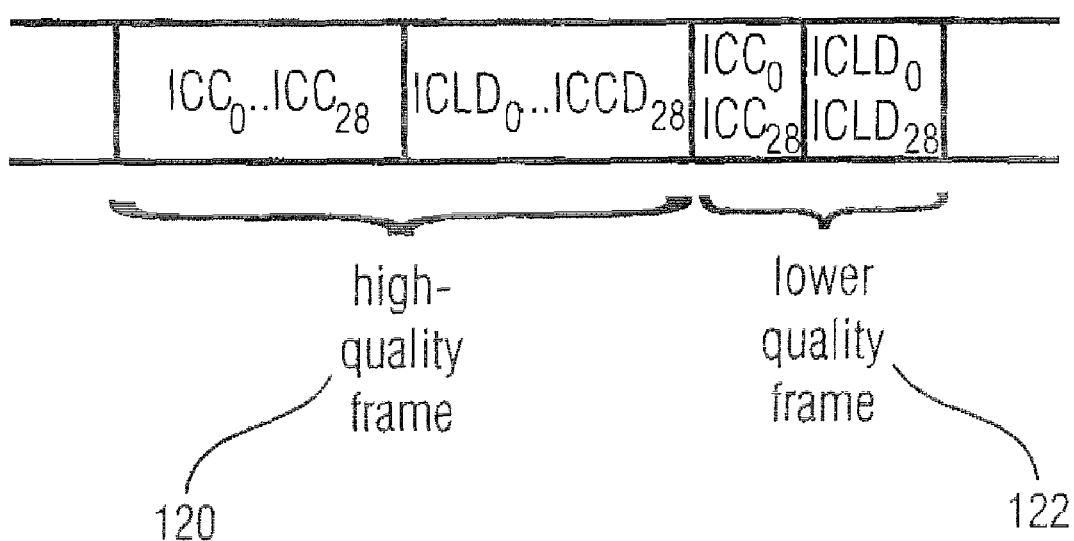
FIG. 2 shows an example of a parameter bit-stream created by the inventive concept.

FIG. 2 shows an example of a parametric representation 112 created by an inventive encoder.

As mentioned above, the processing of the audio signals is done block-wise, i.e. a number of subsequent samples of the multi-channel signal in the time domain, building a so-called frame, is processed in one step. FIG. 2 shows a parameter bit-stream, i.e. a parametric representation for two consecutive frames. The parameter bit-stream is having a representation of a high-quality frame 120 and a representation of a lower quality frame 122. During the encoding of the high-quality frame 120, the decision was taken that the first portion 108, which is being represented by parametric data has to be big compared to the second portion, which may for example be the case if the audio scene to encode is rather complex. The parameter bit-stream of FIG. 2 is furthermore created under the assumption that a preferred embodiment of an inventive encoder is used that does not derive any parametric data for the second portion 110 of the multi-channel signal 106. As can be seen in FIG. 2, 28 spatial parameters ICC and ICLD are included in the parametric representation to describe the high-quality frame 120. For example, the 28 spatial parameters describe the lower frequency bands of a QMF representation of the multi-channel signal.

The lower quality frame 122 comprises only 21 spatial parameter sets having ICC and ICLD parameters as this was found to be sufficient for the desired perceptual quality.

Figure 2A:
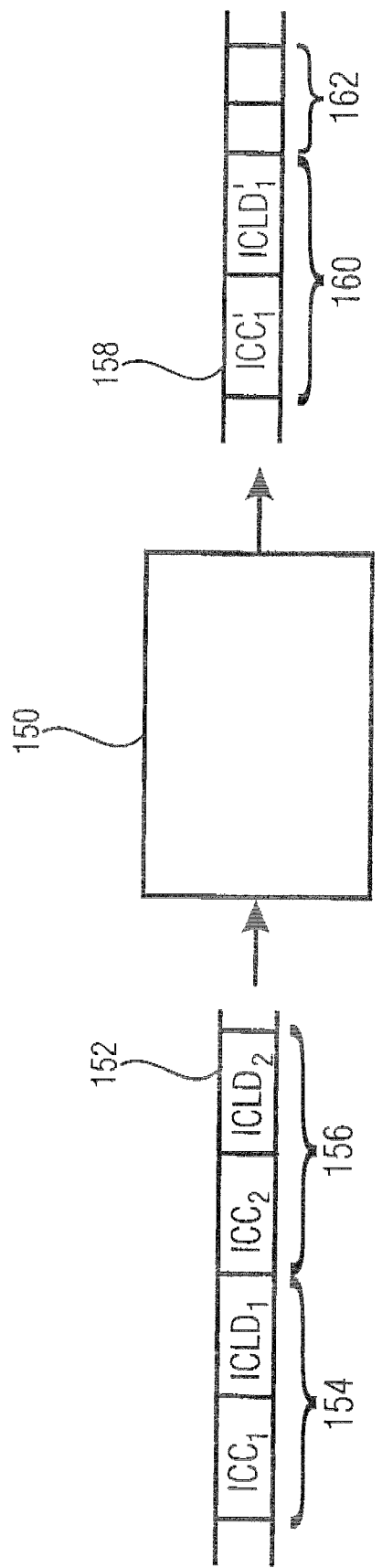
FIG. 2a shows an inventive transcoder.

FIG. 2a shows an inventive transcoder 150. The inventive transcoder receives as an input an input bit stream 152 having a full set of spatial parameters describing a first frame 154 and a second frame 156 of a multi-channel audio signal.

The transcoder 150 generates a bit stream 158 holding a parametric representation representing the spatial properties of the multi-channel audio signal. In the example shown in FIG. 2a, the transcoder 150 derives the parametric representation such that for the first frame the number of parameters 160 is only slightly decreased. The number of parameters 162 describing the second frame corresponding to the input parameters 156 are strongly decreased, which reduces the amount of bit rate needed by the resulting parametric representation significantly. Such an inventive transcoder 150 can therefore be used to post-process an already existing bit stream of spatial parameters to derive an inventive parametric representation requiring less bit rate during transmission or less storage space when stored on a computer-readable medium. It should be noted here that it is of course also possible to implement a transcoder for transcoding in the other direction, i.e. using the parametric representation to generate spatial parameters.

The inventive transcoder 150 can be implemented in various different ways, as for example by reducing the amount of parameters with a given rule or by additionally receiving the multi-channel audio signal to analyze the reduction of bit rate possible without disturbing the perceptual quality beyond an acceptable limit.

Figure 3:
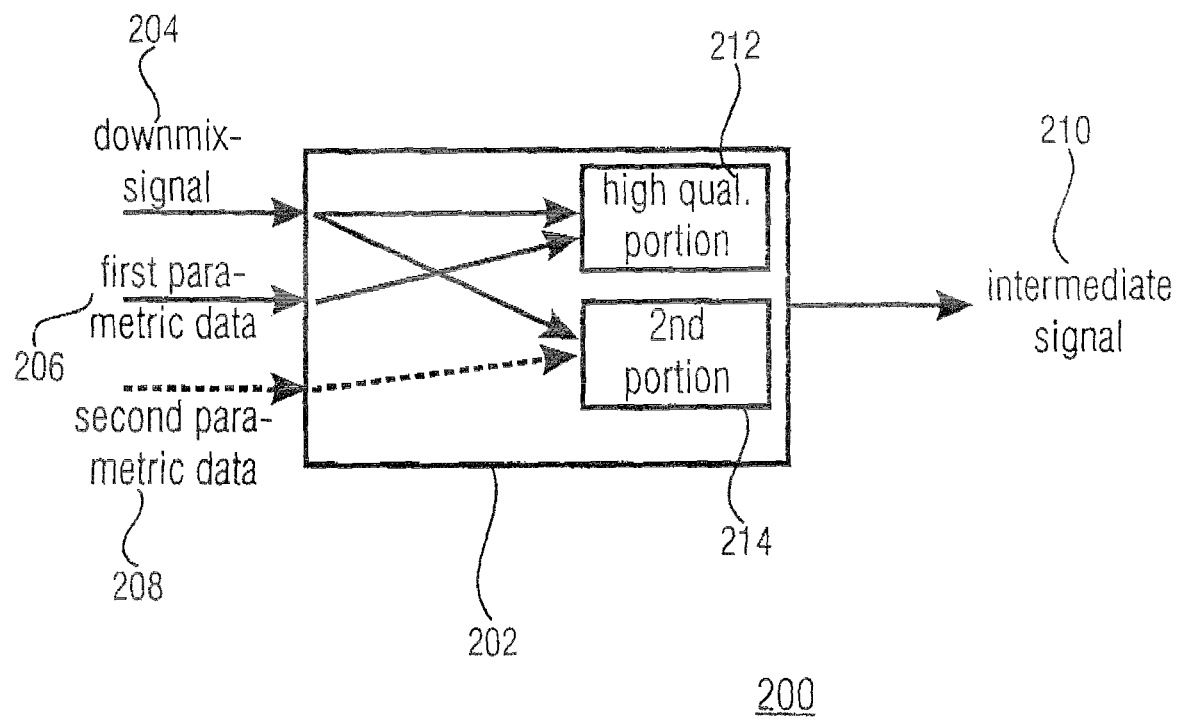
FIG. 3 shows an inventive decoder.

FIG. 3 shows an inventive multi-channel audio decoder 200 having a processor 202.

The processor is receiving as an input a down-mix signal 204 derived from a multi-channel audio signal, first parametric data 206 describing a first portion of the multi-channel signal and, for a second portion of the multi-channel signal, optional second parametric data 208 requiring less bits than the first parametric data 206. The processor 202 is deriving an intermediate signal 210 from the down-mix signal 204 using a first deriving rule for deriving a high-quality portion 212 of the intermediate signal, wherein the high-quality portion 212 of the intermediate signal 212 is corresponding to the first portion of the multi-channel audio signal. The processor 202 is using a second deriving rule for a second portion 214 of the intermediate signal 210, wherein the second deriving rule is using the second parametric data or no parametric data and wherein the first deriving rule is depending on the first parametric data 206.

The intermediate signal 210 derived by the processor 202 is built from a combination of the high-quality portion 212 and of the second portion 214.

The multi-channel audio decoder 200 may derive by itself, which portions of the down-mix signal 204 are to be processed with the first parametric data 206 by applying some appropriate rules, for example counting the number of spatial parameters included in the first parametric data 206. Alternatively, the processor 202 may be signalled the fractions of the high-quality portion 212 and of the second portion 214 within the down-mix signal 204 by some additional window information which is derived on an encoder side and that is additionally transmitted to the multi-channel audio decoder 200.

In a preferred embodiment, the second parametric data 208 is omitted and the processor 202 derives the second deriving rule from information already contained in the down-mix signal 204.

Figure 4:
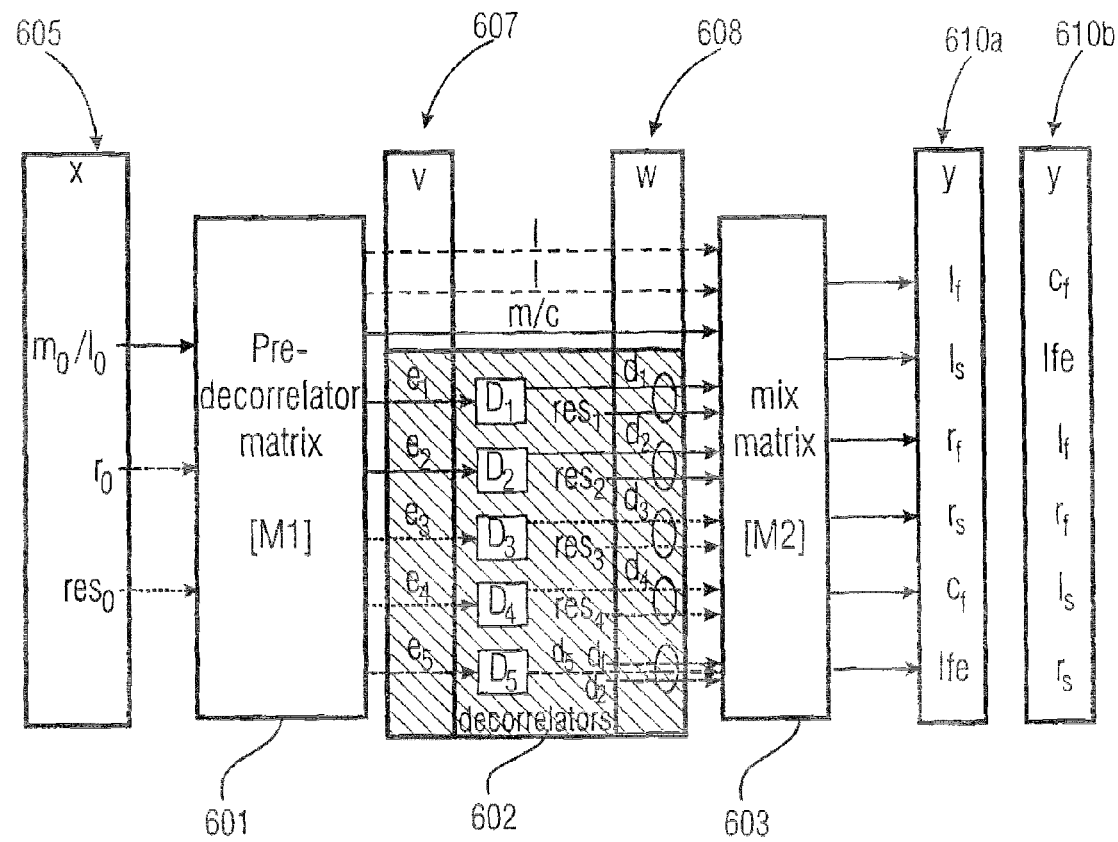
FIG. 4 shows an example of a spatial audio decoder implementing the inventive concept.

FIG. 4 shows a further embodiment of the present invention that combines the inventive feature of matrix compatibility in a spatial audio decoder. The multi-channel audio decoder 600 comprises a pre-de-correlator 601, a de-correlator 602 and a mix-matrix 603.

The multi-channel audio decoder 600 is a flexible device allowing to operate in different modi depending on the configuration of input signals 605 input into the pre-de-correlator 601. Generally, the pre-de-correlator 601 derives intermediate signals 607 that serve as input for the de-correlator 600 and that are partially transmitted unaltered to form, together with decorrelated signals calculated by the de-correlator 602, input signals 608. The input signals 608 are the signals input into the mix-matrix 603 that derives output channel configurations 610a or 610b, depending on the input channel configuration 605.

In a 1-to-5 configuration, a down-mix signal and an optional residual signal is supplied to the pre-de-correlator 601, that derives four intermediate signals ($e_1$ to $e_4$) that are used as an input of the de-correlator, which derives four de-correlated signals ($d_1$ to $d_4$) that form the input parameters 608 together with a directly transmitted signal m derived from the input signal.

It may be noted, that in the case where an additional residual signal is supplied as input, the de-correlator 602 that is generally working in a sub-band domain, may be operative to simply forward the residual signal instead of deriving a de-correlated signal. This may also be done in a frequency selective manner for certain frequency bands only.

In the 2-to-5 configuration the input signals 605 comprise a left channel, a right channel and optionally a residual signal. In that configuration, the pre-de-correlator matrix 601 derives a left, a right and a center channel and in addition two intermediate channels ($e_1$, $e_2$). Hence, the input signals to the mix-matrix 603 are formed by the left channel, the right channel, the centre channel, and two de-correlated signals ($d_1$ and $d_2$).

In a further modification, the pre-de-correlator matrix may derive an additional intermediate signal ($e_5$) that is used as an input for a de-correlator ($D_5$) whose output is a combination of the de-correlated signal ($d_5$) derived from the signal ($e_5$) and the de-correlated signals ($d_1$ and $d_2$). In this case, an additional de-correlation can be guaranteed between the centre channel and the left and the right channel.

The inventive audio decoder 600 implements the inventive concept in the 2-to-5 configuration. The transmitted parametric representation is used in the pre-de-correlation matrix 601 and in the mix-matrix 603. There, the inventive concept can be implemented in different ways as shown in more detail in FIG. 5.

Figure 5:
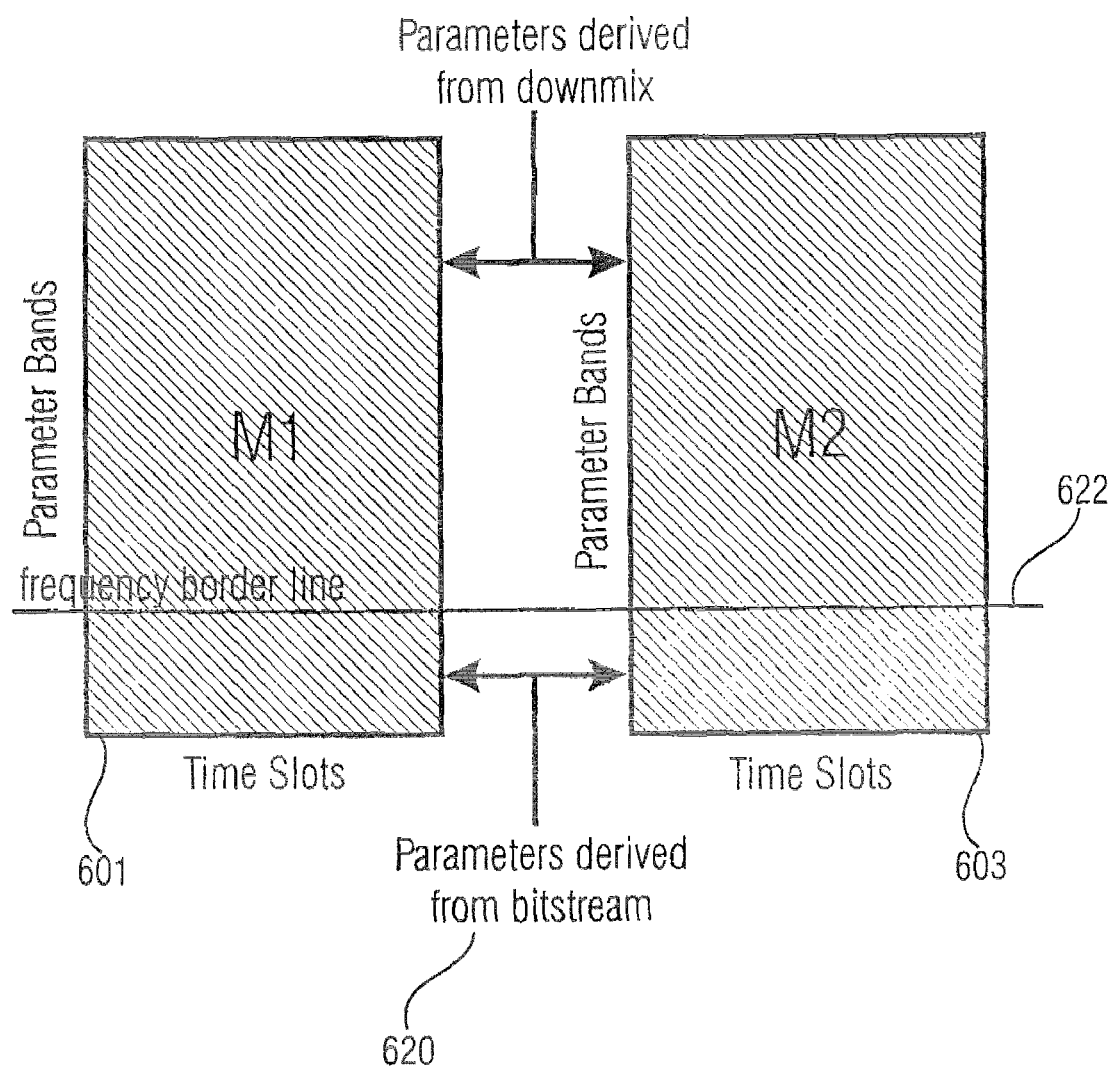
FIG. 5 illustrates the use of the different coding schemes on a decoder side.
Figure 6:
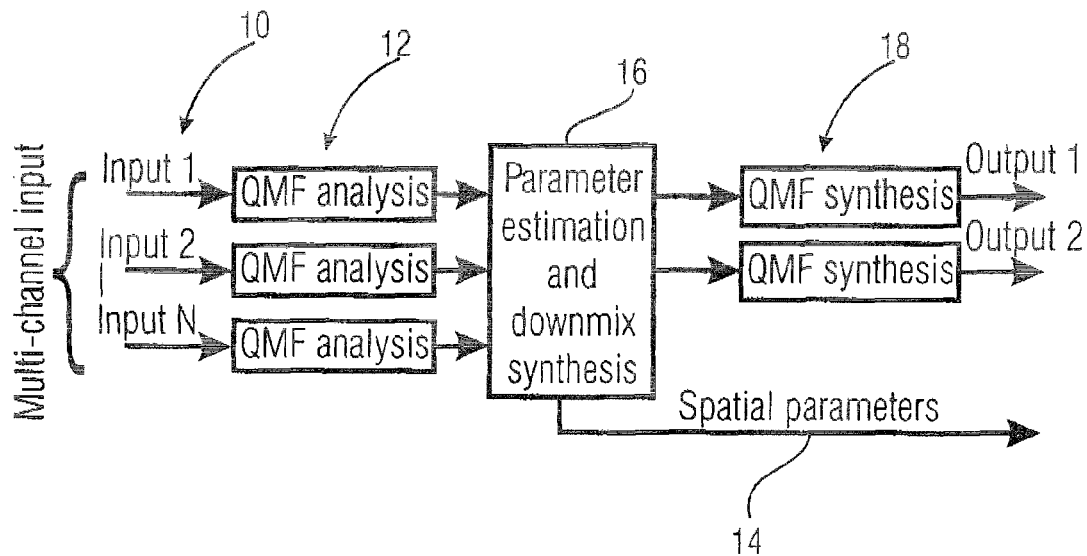
FIG. 6 shows a prior art encoder.
Figure 7:
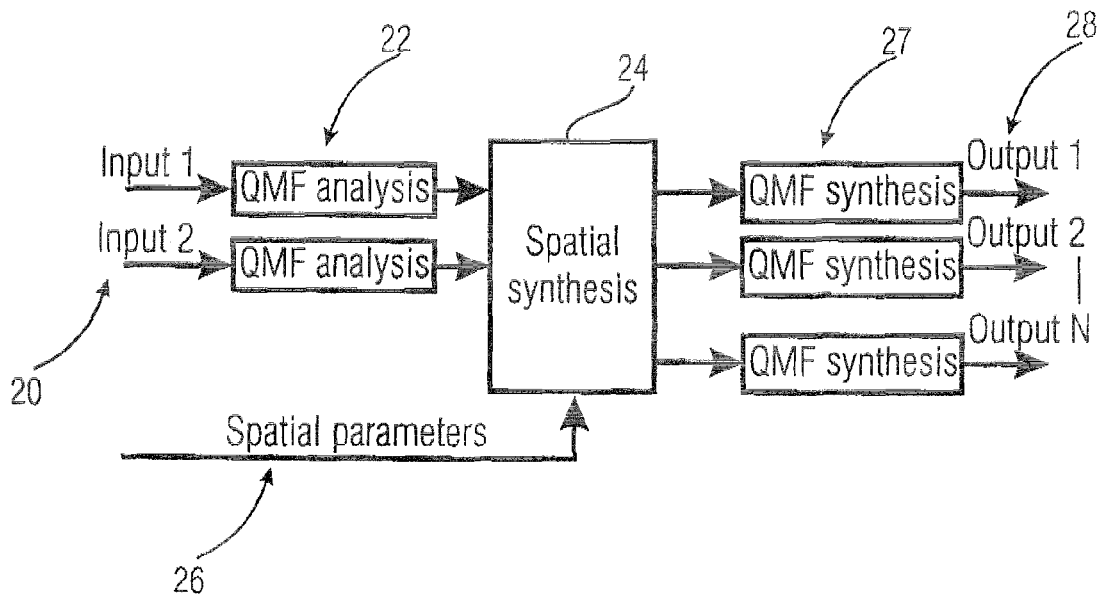
FIG. 7 shows a prior art decoder.
Figure 8:
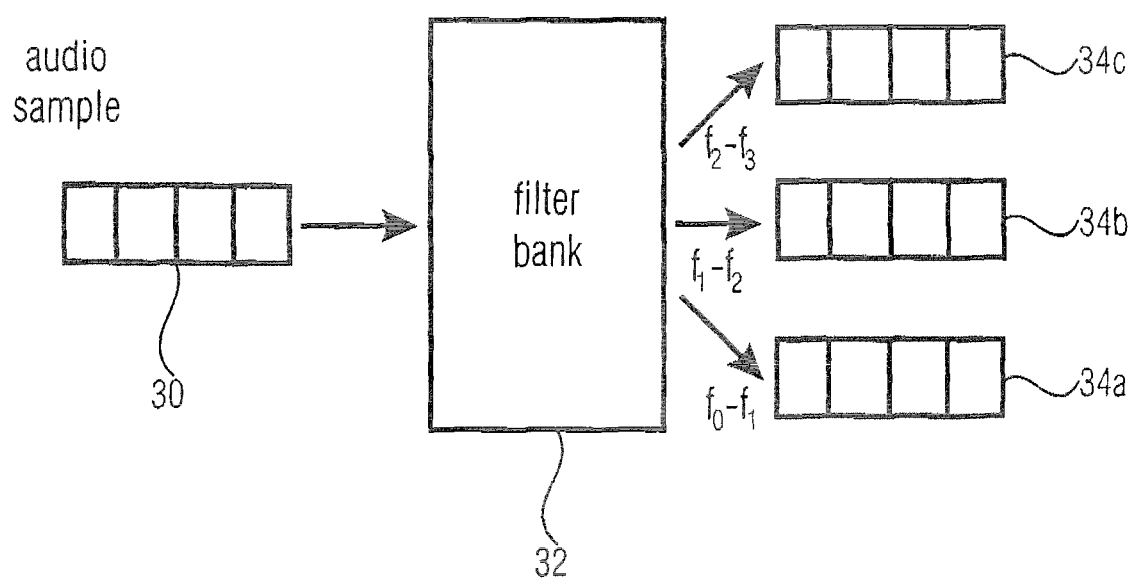
FIG. 8 shows a block diagram of a filterbank.
Figure 9:
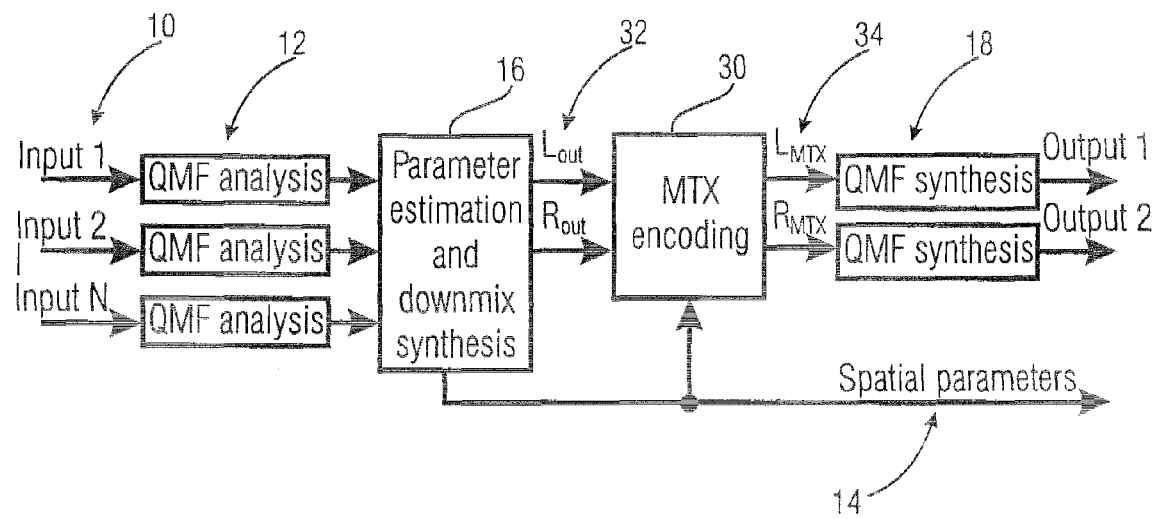
FIG. 9 shows a further example of a prior art encoder.

FIG. 5 shows the pre-de-correlator, implemented as pre-decorrelator-matrix 601 and the mix-matrix 603 in a principle sketch, wherein the other components of the multi-channel audio decoder 600 are omitted.

The matrix used to perform the pre-de-correlation and the mixing has columns that represent time slots, i.e. the individual time samples of a signal and rows that represent the different parameter bands, i.e. each row is associated with one parameter band of an audio signal.

According to the concept of the present invention, the matrix elements of the matrices 601 and 603 are only partly derived from transmitted parametric data, wherein the remaining matrix elements are derived by the decoder, based for example on knowledge of the down-mix signal. FIG. 5 shows one example where below a given frequency border line 622 the elements of the pre-de-correlator matrix 601 and the mix-matrix 603 are derived from parameters 620 that are read from the bit-stream, i.e. based on information transmitted from the encoder. Above the frequency borderline 622 the matrix elements are derived in the decoder based on knowledge of the down-mix signal only.

The border frequency (or in general: the amount of matrix elements derived from transmitted data) can be freely adapted according to the quality and/or bit-rate constraints that have to be met for the particular application scenario.

It is preferred for the novel coding method outlined here that a side-information free up-mix process may be performed with the same structure that has been outlined in the MPEG Spatial Audio Coding Reference Model 0. This invention may consist in describing a method for side-information free up-mix, but preferably provides a method for seamless and advantageous combination of such concepts with methods for side-information assisted up-mix.

In contrary to the MPEG Spatial Audio Coding Reference Model 0, in the side-information free up-mix process the elements of the matrices M1 (601) and M2 (603) are preferably not derived from data transmitted in a bit-stream but by different means without the help of side-information, e.g. by applying heuristic rules based only on knowledge achieved from the down-mix signal.

In this way it is possible to achieve a gradual scaling between both techniques—in terms of bit-rate as well as in terms of sound quality—by acquiring only parts of the matrices based on the transmitted parameters and applying the rules of the method without side-information to fill up the remaining parts. Conceptually speaking, this corresponds to transmitting for certain parts of the matrices the spatial parameters and for other parts generating them at the decoder.

The determination of the parts of matrices that are to be derived from either the one ore the other method can be done in a lot of different ways, such as deriving the parts of the matrices below a given horizontal border line by one method and above this border line by the other method;

deriving the parts of the matrices left of a given vertical border line by one method and right from this border line by the other method;

determining arbitrary time-frequency tiles within both matrices the elements of which are derived by one method and deriving the elements of the remaining time-frequency tiles by means of the other method.

It has been detailed in the above paragraphs that it is advantageous to describe all frequency parts of a multi-channel signal up to a certain border frequency by spatial parameters whereas the remaining frequency parts of the multi-channel signal are not represented by spatial parameters. This takes into account the characteristics of the human ear that has a better perception of lower frequencies than of higher frequencies. Of course, the present invention is by no means limited to this splitting of the multi-channel signal into a first portion and a second portion as it may also be advantageous or appropriate to describe higher frequency parts of the signal with better accuracy. This may especially be the case when in the lower frequency region only little energy is contained in the signal since most of the energy is contained in a high-frequency domain of the audio signal. Due to masking effects the low-frequency part will be mostly dominated by the high frequency parts then and it may be advantageous to provide the possibility for a high-quality reproduction of the high-frequency part of the signal.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. Multi-channel audio decoder for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, comprising:
 a processor for deriving an intermediate signal from the audio signal,
  using a first deriving rule for deriving a first portion of the intermediate signal, the first portion of the intermediate signal corresponding to the first portion of the multi-channel audio signal, wherein the first deriving rule is depending on the first parametric data; and
  using a second deriving rule for deriving a second portion of the intermediate signal, the second deriving rule using no parametric data or the second parametric data.

2. Multi-channel audio decoder in accordance with claim 1, which is operative to process first parametric data that is describing a time portion or a frequency portion of the multi-channel signal.

3. Multi-channel audio decoder in accordance with claim 1, which is operative to process first parametric data that is comprising a description of a time portion of the multi-channel audio signal, wherein only information on a predetermined frequency band of the multi-channel audio signal is contained within the description.

4. Multi-channel audio decoder in accordance with claim 1, in which the processor is operative to use the first deriving rule for deriving a frequency portion of the intermediate signal ranging from a low-frequency limit to a high-frequency limit.

5. Multi-channel audio decoder in accordance with claim 4, which is operative to additionally process a window information signalling at least the high-frequency limit.

6. Multi-channel audio decoder in accordance with claim 4, which is operative to derive at least the high-frequency limit from the first parametric data using a window estimation rule.

7. Multi-channel audio decoder in accordance with claim 6, in which the window estimation rule includes counting the amount of parametric data submitted for a signal portion of the audio signal and comparing the counted amount of parametric data with a nominal amount of parametric data, wherein the audio signal is a down-mix signal.

8. Multi-channel audio decoder in accordance with claim 1, in which the processor is operative to calculate the second deriving rule from information on the audio signal or from the second parametric data, wherein the audio signal is a down-mix signal.

9. Multi-channel audio decoder in accordance with claim 1, in which the processor is operative to use a predefined rule as the second deriving rule.

10. Multi-channel audio decoder in accordance with claim 1, which is operative to process parametric data that is comprising one or more spatial audio parameters chosen from the following list of spatial audio parameters:
 ICC (inter-channel correlation)
 CLD (channel level difference)
 CPC (channel prediction coefficient).

11. Multi-channel audio decoder in accordance with claim 1, further comprising a de-correlator to derive a de-correlated signal from the intermediate signal using a de-correlation filter.

12. Multi-channel audio decoder in accordance with claim 1 further comprising an up-mixer for calculating a reconstruction of the multi-channel signal,
 using a first up-mixing rule for calculating a first portion of the reconstruction of the multi-channel signal corresponding to the first portion of the multi-channel signal, wherein the first upmixing rule is depending on the first parametric data; and
 using a second up-mixing rule for calculating a second portion of the reconstruction of the multi-channel signal, the second up-mixing rule using no parametric data or the second parametric data.

13. Non-transitory storage medium having stored thereon a parametric representation describing spatial properties of a multi-channel audio signal, the parametric representation including first parametric data for a first portion of the multi-channel signal and wherein for a second portion of the multi-channel signal no parametric data or second parametric data is included, the second parametric data requiring less information units than the first parametric data for an identical portion of the multi-channel signal, wherein the parametric representation results in a processed audio signal when input into a multi-channel audio decoder for processing an audio signal according to claim 1.

14. Multi-channel encoder for generating a parametric representation describing spatial properties of a multi-channel audio signal, the multi-channel encoder comprising:
 a parameter generator for generating spatial parameters;
 an output interface for generating the parametric representation,
 wherein the parameter generator or the output interface is adapted to generate the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

15. Multi-channel encoder in accordance with claim 14, in which the output interface is further adapted to include a window information in the parametric representation, the window information indicating the first portion of the multi-channel audio signal.

16. Multi-channel encoder in accordance with claim 14, further including a portion decider for deciding which portion of the multi-channel signal is used as the first portion, using a quality criterion.

17. Multi-channel encoder in accordance with claim 16, in which the portion decider is operative to decide such that a quality of a reconstruction of the multi-channel signal using the parametric representation stays within a quality-tolerance range.

18. Multi-channel encoder in accordance with claim 16, in which the portion decider is operative to decide such that a maximum amount of storage space consumed by the parametric representation is not exceeded.

19. Multi-channel encoder in accordance with claim 14, additionally comprising a down-mixer for deriving a down-mix signal from the multi-channel signal; and
 in which the output interface is further adapted to output the down-mix signal.

20. Multi-channel encoder in accordance with claim 19, in which the parameter generator is operative to generate a full set of spatial parameters for the first portion and for the second portion of the multi-channel signal;

in which the down-mixer is operative to derive the down-mix signal using a full down-mixing rule depending on the full set of spatial parameters; and in which the output interface is operative to generate the parametric representation using at least the spatial parameters corresponding to the first portion of the multi-channel signal.

21. Method for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, the method comprising:

deriving, by a processor, an intermediate signal from a down-mix signal using a first deriving rule depending on the first parametric data for deriving a first portion of the intermediate signal, the first portion of the intermediate signal corresponding to the first portion of the multi-channel audio signal; and deriving a second portion of the intermediate signal using a second deriving rule, the second deriving rule using the second parametric data or no parametric data, wherein the processor comprises a hardware implementation.

22. Method for generating a parametric representation describing spatial properties of a multi-channel audio signal, the method comprising:

generating, by a parameter generator, spatial parameters; and generating, by an output interface, the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal, wherein the parameter generator or the output interface comprises a hardware implementation.

23. A non-transitory storage medium having stored thereon a computer executable program code, for performing a method for processing an audio signal and for processing first parametric data describing a first portion of a multi-channel signal, wherein for a second portion of the multi-channel signal no parametric data or second parametric data is processed, the second parametric data requiring less information units than the first parametric data when describing an identical portion of the multi-channel signal, the method comprising:

deriving an intermediate signal from a down-mix signal using a first deriving rule depending on the first parametric data for deriving a first portion of the intermediate signal, the first portion of the intermediate signal corresponding to the first portion of the multi-channel audio signal; and deriving a second portion of the intermediate signal using a second deriving rule, the second deriving rule using the second parametric data or no parametric data.

24. A non-transitory storage medium having stored thereon a computer executable program code, for performing a method for generating a parametric representation describing spatial properties of a multi-channel audio signal, the method comprising:

generating spatial parameters; and generating the parametric representation such that the parametric representation includes first parametric data for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

25. Transcoder for generating a parametric representation of a multi-channel audio signal using spatial parameters describing the spatial properties of the multi-channel audio signal, comprising:

a parameter generator to generate the parametric representation such that the parametric representation includes first parametric data being derived from the spatial parameters for a first portion of the multi-channel signal and wherein for a second portion of the multi-channel signal no parametric data or second parametric data is included in the parametric representation, the second parametric data requiring less information units than the first parametric data when describing an identical portion of the multi-channel signal.

* * * * *